United States Patent [19]

Roemer et al.

[11] 4,206,268
[45] Jun. 3, 1980

[54] PLAIN BEARING LAMINATE HAVING SLIDE-LAYER ALLOY BASED ON COPPER-LEAD-TIN

[75] Inventors: Erich Roemer, Wiesbaden; Fritz Niegel, Ostrich, both of Fed. Rep. of Germany

[73] Assignee: Glyco-Metall-Werke Daelen & Loos GmbH, Wiesbaden-Schierstein, Fed. Rep. of Germany

[21] Appl. No.: 951,321

[22] Filed: Oct. 16, 1978

[30] Foreign Application Priority Data

Oct. 22, 1977 [DE] Fed. Rep. of Germany ....... 2747545

[51] Int. Cl.² .................. B32B 15/18; B32B 15/20
[52] U.S. Cl. ......................... 428/643; 75/156; 428/644; 428/645; 428/675; 428/676; 428/926
[58] Field of Search ............ 428/643, 644, 645, 647, 428/648, 674, 675, 676, 677, 926; 204/44, 435; 75/154, 156, 163, 134 B, 166 D, 166 E

[56] References Cited

U.S. PATENT DOCUMENTS

| | | | |
|---|---|---|---|
| 1,686,277 | 10/1928 | Judy | 75/156 |
| 2,004,708 | 6/1935 | Pfanstiehl | 75/163 |
| 2,033,321 | 3/1936 | Boegehold | 75/163 |
| 2,558,523 | 6/1951 | Lather | 75/156 |
| 3,180,008 | 4/1965 | Elderkin et al. | 428/645 |
| 3,869,259 | 3/1975 | Lindsey | 75/156 |
| 3,950,141 | 4/1976 | Roemer | 428/643 |
| 3,957,594 | 5/1976 | Grellet | 204/44 |

FOREIGN PATENT DOCUMENTS

| | | | |
|---|---|---|---|
| 941197 | 2/1974 | Canada | 75/156 |
| 228345 | 2/1925 | United Kingdom | 75/156 |
| 324206 | 1/1930 | United Kingdom | 75/156 |

*Primary Examiner*—L. Dewayne Rutledge
*Assistant Examiner*—W. G. Saba
*Attorney, Agent, or Firm*—H. Gibner Lehmann; K. Gibner Lehmann

[57] ABSTRACT

A multi-layered plain slide bearing having a metal base layer, and having a slide layer which is carried by the base layer and which comprises a copper-lead-tin binary or ternary alloy that has been applied to the base layer and that has an unusually high cooper content. The slide layer can contain, by weight, from 20% to 70% of copper, at least 15% and at the most 80% of lead, and from 0% to 30% of tin, and can also optionally contain indium, cadmium or other like metals. The slide bearing can further include a run-in layer which covers the slide layer, and which contains copper, tin, indium and/or lead or their oxides, sulfides or phosphides.

18 Claims, 3 Drawing Figures

PLAIN BEARING LAMINATE HAVING SLIDE-LAYER ALLOY BASED ON COPPER-LEAD-TIN

CROSS REFERENCES TO RELATED APPLICATIONS

1. Copending application of Erich Hodes and Danilo Sternisa, entitled "Laminated Material for the Production of Plain Bearing Elements and Method for its Production" filed Nov. 10, 1977 under Ser. No. 850,159 and having the same ownership as the present application.

2. Copending application of Erich Hodes and Danilo Sternisa, entitled "Laminated Material and Method for its Production by Means of Theremokinetic Plating", filed Nov. 14, 1977 under Ser. No. 851,472 and having the same ownership as the present application.

3. Copending application of Erich Roemer, entitled "White Metal Bearing Alloy of Lead, Tin and Copper, for Plain Bearing Laminates", filed Nov. 14, 1977 under Ser. No. 851,398 and having the same ownership as the present application.

4. Copending application of Erich Hodes and Danilo Sternisa, entitled "Method and Equipment for Producing Thin, Composite Laminates," filed Feb. 6, 1978 under Ser. No. 875,132 and having the same ownership as the present application.

5. Copending application of Erich Hodes and Danilo Sternisa entitled "Laminate, Particularly for Anti-Friction and Slide Members, and Method for the Production of the Same", filed Feb. 7, 1978 under Ser. No. 875,810 and having the same ownership as the present application.

BACKGROUND

This invention relates to plain bearings having slide layer alloys based on copper-lead-tin, and more particularly to bearing laminates which have metallic supporting bodies.

It is already known to provide white metal bearing alloys based on a lead-tin-copper content in which up to 6% copper by weight is considered to be optimal. White metal bearing alloys have subsequently been suggested, wherein the copper content can be as high as 10% by weight with improved results.

In contrast to the foregoing, plain bearings having slide layer alloys of copper-lead-tin content, wherein a considerably higher percentage by weight of copper is utilized are frequently produced, these being known as bronze alloy bearings.

In foundry technology, bronze bearing alloys of this type are produced with a lead content of up to about 40% by weight, the lead distribution being coarse in part, due to dissociation processes, whereby their production presents a number of problems. Below 25% of lead, however, a relatively uniform bearing alloy structure is obtainable by casting, generally without difficulties. According to experience, low tin contents are used in such alloys; in isolated cases up to about 4%. Beyond this, lead-tin bronzes with decreasing lead content and increasing tin content are also being produced, by casting. For example, alloys with about 17% lead and 5% tin, or with 10% lead and 5% tin or with 10% lead and 10% tin are being frequently used.

However, there is an ever-increasing demand to inexpensively produce alloys of higher quality sliding properties, i.e. with a higher lead content while still retaining a uniform structure, but this has invariably met with foundry-related problems. One solution involved the development of sinter alloys. In such sintering of bearings, a copper-lead powder producing a finish alloy was used first, having as a limit for practical applications a lead content of approximately 35%. Here again, higher lead concentrations were subject to dissociation action during the sintering. In connection with this same problem, a bronze alloy having approximately 49% copper, 1% tin and 50% lead was developed, by producing a so-called impregnated sinter alloy. The procedure in producing the impregnated sinter alloy is such that a porous layer resembling a sponge is first sintered onto a metal base or carrier strip, by sintering copper powder and tin-bronze powder, and then this porous layer is impregnated with lead or a lead-tin alloy in a reducing atmosphere. There was also produced similar material, made by impregnating a porous sintered-on layer consisting of copper and nickel, with an alloy of lead having additives of tin and antimony. The total weight content of the lead, tin and antimony amounted to about 40%. In some cases, the impregnated sinter alloy layers are provided additionally with a covering layer of the impregnating alloy, to improve the slide properties.

The suitability of such bronze alloys, intended in particular for plain or slide bearings, can generally be described as follows:

Those alloys which are produced by casting are usually of satisfactorily high mechanical strength, but if they are not provided with additional slide layers, the inherent slide properties limit their application to moderate sliding speeds. In addition, at high lubricant temperatures, such alloys are susceptible to corrosion. The strength of these alloys decreases with a lead content above 25% because of the occurrence of lead liquations in the structure; at the same time, their susceptibility to lead corrosion in oil which has aged, automatically increases. Therefore, in heavy-duty multi-layered plain bearings, the foregoing bronze alloys are used almost exclusively in intermediate layers. The same applies to only sintered, lead-bronze constituted of finish-alloyed powder, where the mechanical strength is basically already lower, but where the susceptibility to liquation at higher lead contents is also lower, as well.

The impregnated sinter alloys have a coarse structure as compared to the sinter-bronze alloys described earlier, but due to their special structure, their stength is favorable considering their high lead contents. The coarse structure, possibly with the simultaneous use of tin-less impregnating alloys, results in an increased susceptibility to lead corrosion due to old or aged oils, particularly at elevated temperatures, and additionally there is a risk of erosion due to the high lubricant velocities at greater sliding speeds. However, the impregnated sinter alloys can be made largely corrosion resistant by the use of a nickel-containing copper alloy with tin and antimony being added to the impregnating alloy, but the automatically resultant coarse structure is of poor fatigue strength. Above all, the necessary additional cover or slide layer will start to crumble prematurely, so that the fatigue strength is not materially improved over the conventional white metal slide layers.

Practice has also demonstrated that, under the higher requirments which these plain bearing materials must meet nowadays with respect to fatigue, corrosion, and wear resistance, the results obtained are not always satisfactory, so that a need remains for a still further improved alloy.

SUMMARY

The above drawbacks and disadvantages of prior plain bearing laminates are obviated by the present invention, and accordingly an object of the invention is to provide an improved plain multi-layered bearing incorporating a copper-tin alloy, which has substantially improved characteristics especially advantageous for internal combustion engines, such as supercharged Diesel engines, gasoline engines with injection or turbo supercharging, etc., the alloy layer of which is capable of absorbing the greater stresses which are present and being particularly applicable as the slide layer in such highly-stressed multi-layered plain bearings.

According to the invention, the problem is solved by producing a ternary alloy, either electrochemically or else precipitated from a gaseous phase, in the form of a slide layer in a bearing, said alloy being predominantly of from 20% to 70% copper by weight, at least 15% and at most up to 80% lead by weight, and from 0% to 30% tin.

The electro-deposited layer can preferably have a layer thickness of from 0.005 mm to 0.1 mm, in particular 0.012 mm, for instance, for motor vehicle engines at about 90° C. to 150° C. lubricant entry temperature under full load, or on the other hand a thickness up to about 0.05 mm for marine Diesel engines (at low lubricant temperatures).

Significant improvements with respect to fatigue, corrosion, and wear resistance have been achieved with copper-lead alloys of higher copper content produced according to the invention, by electrodeposition. Lead-tin-copper alloys formed as electrodeposited cover or slide layers for complex bearings are already known. However, cover or slide layers only up to 10% copper and 20% tin, with the balance lead, have been used. In addition, intermediate layers (also electrodeposited) up to 20% copper have been previously suggested.

Test runs made with plain bearings according to the invention, having a cover or slide layer which consists of 30% to 60% copper, 15% to 20% tin and the balance lead, applied by electrodeposition to a cast intermediate layer of lead-bronze have surprisingly shown an extraordinarily good slide behavior, and in particular a remarkable resistance to corrosion. Such slide layers can be operated without wear for more than 100 hours in a plain bearing test stand under intermittent loads of 65 N/mm$^2$ with aged lubricants and entry temperatures into the plain bearing of about 150° C. The layers, produced by electrodeposition as cover or slide layers, were intentionally damaged in their slide surfaces prior to the test. Although no special test instructions were followed for these damaged plain bearings, no further damage occurred under full load. The leadbronze intermediate layer was bared only due to the smoothing out of the previously-applied mutilations, such baring occurring under the beads which were necessarily formed on the surface of the layer. As was to be expected, corrosion developed in the intermediate layer of cast lead-bronze, whereas the cover layer or slide layer provided by the invention, of copper-lead-tin alloy that was applied by electrodeposition, surprisingly showed no signs of corrosion. It can be concluded, therefore, that the cover or slide layer, consisting of a copper-lead-tin alloy in the new high-copper alloying composition as produced by electrodeposition according to the invention, effects a particularly good fatigue, wear, and corrosion resistance. Compared with conventional cover or slide layers produced by electrodeposition and having a Vickers hardness (HV 0.005) of about 10 to 20 at room temperature, the bronze-like plain bearing alloy according to the invention as produced by electrodeposition has a Vickers hardness up to about 150. In connection with the test results conducted under intermittent loads it can be concluded that the endurance limit of the plain bearing alloy according to the invention is much greater than that of conventionally-produced plain bearing alloys.

Further tests have shown that the high-copper alloys according to the invention, containing about 20% copper, already have a greater wear resistance and that, at lubricant entry temperatures of about 150° C., the fatigue strength of thin layers already also reaches 65 N/mm$^2$. For example, under the above temperature conditions, a copper-lead-tin alloy with approximately 25% copper and 23% tin with the balance lead, quantitatively showed the same wear under an intermittent load of 60 N/mm$^2$ as did a conventional lead-tin-copper alloy with only 3% copper, 10% tin and the balance lead, but under a load of only 13 N/mm$^2$. The fatigue strength was thus seen to be increased by about 20%.

The Vickers hardness of the alloy according to the invention as produced by electrodeposition with 25% copper, 23% tin and the balance lead, is 55. The excellent corrosion resistance of this alloy despite its greater copper content is particularly surprising, for it is assumed according to the state of the art, that the tin present is bound to the copper due to the effect of heat during the operation or due to a preceding heat treatment, and that the lead is automatically embedded as almost pure lead in generally a manner similar to that in cast or sintered lead-bronze or lead-tin-bronze. The extraordinarily high corrosion resistance can be attributed to the extremely fine distribution of the lead in the alloy. Success has been achieved by this inventive measure, in discovering that plain bearing alloys based on copper-lead-tin with 20% to 50% copper can be produced by the application of the electrolytic process, even to producing bronze-like alloys with more than 50% copper which can be used for extremely high lubricant temperatures and greater sliding speeds.

Tests have shown that the fine-grained lead distribution stays intact even when no tin at all is used. Therefore, a tin-less copper-lead plain bearing alloy with a high copper content is suited just as well as a cover or slide layer in some applications. But the sliding characteristics are doubtlessly better when tin is present.

The good mechanical, physical, and chemical properties of the CuPbSn plain bearing alloy of the invention make possible its application as cover or slide layers on steel-lead-bronze or steel-aluminum alloys or other bearing alloys. On the other hand, the good properties of the alloy according to the invention make its direct application to a steel carrier appear feasible also. In special cases it can be possible to obviate intermediate layers of lead-bronze or aluminum alloys entirely, when the alloys according to the invention are used.

In special applications, additional cover layers of different chemical compositions are just as useful as previously, for instance as run-in layers. The good properties already present in the bronze-like plain bearing alloy produced by electrodeposition can, if required, be improved once more by additional heat treatments between 120° and 320° C., preferably between 150° and 300° C. This, for instance, improves the bonding strength of the electrodeposited layer to the supporting cup or intermediate layer.

Two embodiment examples of multi-layered plain bearings with bearing alloys according to the invention are illustrated in FIGS. 1 to 3, in which.

Figure 1:
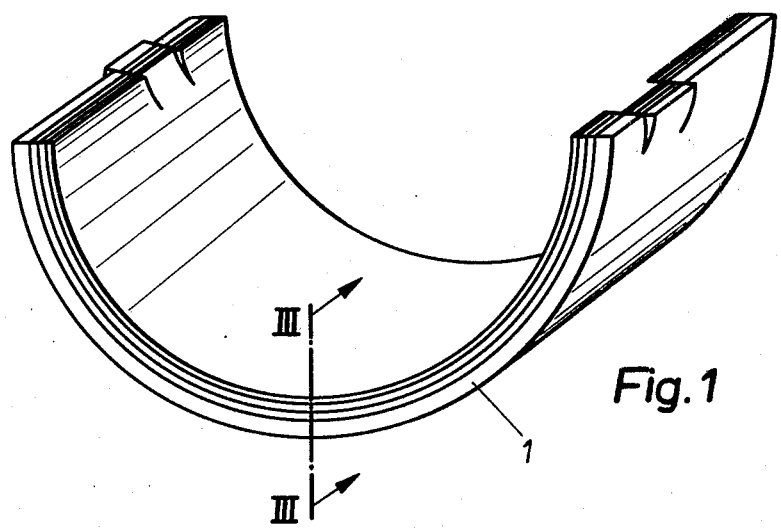
FIG. 1 is a perspective view of a bearing cup.
Figure 2:
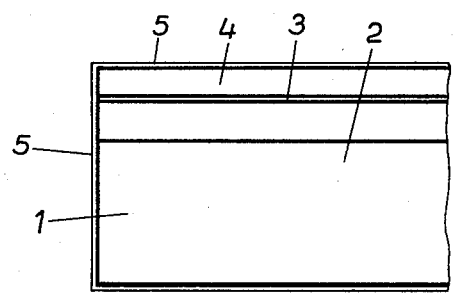
FIG. 2 is a part section, taken along the line III—III of FIG. 1.
Figure 3:
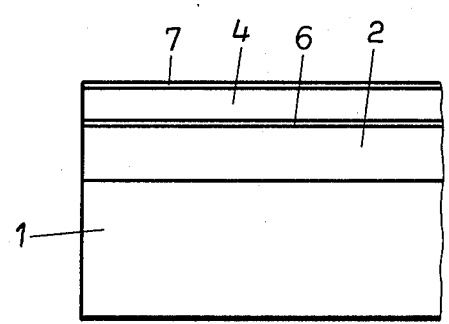

FIG. 3 a part section similar to that of FIG. 2, but of a modified embodiment.

Referring to FIG. 2, a metallic supporting body 1, preferably of steel, is provided in the multi-layer bearing shown therein. Applied to the supporting body 1 is a metallic intermediate layer having emergency running properties, such as of lead-bronze or tin-bronze. The intermediate layer 2, in turn, is covered by a hard, wear-resistant sub-slide layer 3 consisting of a nickel-tin alloy of, say, 65% tin and 35% nickel. This sub-slide layer may be from 0.003 to 0.05 mm thick. Laid on top of this hard, wear-resistant sub-slide layer 3 is the slide layer 4 according to the invention. The slide layer 4 is formed of a copper-lead-tin alloy with a copper content of between 20% and 70%. The entire bearing cup, i.e. the supporting body 1 with its layers 2, 3, 4, is enclosed by a tin or tin-lead alloy corrosion layer, preferably applied by electrodeposition, as indicated at 5 in FIG. 2. Involved here is a thin flash, hardly visible on the surface of the slide layer 4, but offering an effective corrosion protection, such as against humidity, particularly in the area of the supporting body 1 prior to the assembly of the bearing.

In the example of FIG. 3, an intermediate layer 2 with emergency running properties, such as of lead-tin bronze or an aluminum alloy, is appled to the supporting body 1. This intermediate layer 2 supports the slide layer 4 provided according to the invention, which is formed of a copper-lead-tin alloy having a composition such as of 50% copper, 10% tin and the balance lead. A thin nickel layer 6 is provided between the intermediate layer 2 and the slide layer 4, as a diffusion-prohibiting layer. In this example, the slide layer 4 is covered by a run-in layer 7, which is formed by alloy components which were transformed into sulfides or oxides on the surface of the slide layer 4, i.e. into lead sulfide and copper sulfide. The run-in layer 7 thus formed may have a thickness of between about 0.1 um and 2 um, preferably between 0.5 um and 1.0 um.

The knowledge gained from the present inventive improvement indicates that the fine-grained structure obtained by the electrochemical precipitation is the cause of the good corrosion and wear resistance, and permits the further conclusion according to the invention that layers of similarly good properties can also be produced by precipitation of the alloy from a gaseous phase.

Examples of processes of layer precipitation from a gaseous phase are here given below:
1. Chemical vapor deposition.
2. Evaporation.
3. Reactive evaporation; and
4. Sputtering, such as cathodic evaporation.

We claim:

1. A multi-layered plain slide bearing having a base layer and having a slide layer carried by said base layer, said slide layer being constituted of an electrochemically-deposited alloy which substantially contains by weight from 20% to 70% of copper, at least 15% and at most 80% of lead, and from 0% to 30% of tin, said slide layer having a thickness of from 0.002 mm to 0.1 mm.

2. A multi-layered plain slide bearing as in claim 1, wherein the copper content of the alloy is substantially 50% by weight, the tin content of the alloy is substantially 10% by weight, with the balance of the alloy constituted of lead.

3. A multi-layered plain slide bearing as in claim 1, wherein the slide layer comprises basically an alloy having between 20% and 70% of copper by weight and containing minute amounts of anitmony up to 1%.

4. A multi-layered plain slide bearing as in claim 1, wherein the slide layer comprises basically an alloy having between 20% and 70% of copper by weight and containing minute amounts of indium.

5. A multi-layered plain slide bearing as in claim 1, wherein the slide layer comprises basically an alloy having between 20% and 70% of copper by weight and containing minute amounts of cadmium.

6. A multi-layered plain slide bearing as in claim 1, wherein at least one intermediary metallic layer is provided between the said base layer and the said slide layer, the said slide layer being electrochemically-deposited onto the uppermost one of the said intermediary layers.

7. A multi-layered plain slide bearing as in claim 1, wherein at least one intermediary metallic layer and a diffusion-prohibiting layer are provided between the said base layer and the said slide layer, the said slide layer being electrochemically-deposited onto the said diffusion-prohibiting layer which is interposed between the said intermediary layer and the said slide layer.

8. A multi-layered plain slide bearing as in claim 1, wherein the said slide layer is covered by a corrosion-protecting layer.

9. A multi-layered plain slide bearing as in claim 1, wherein the slide layer is covered by a run-in layer, said run-in layer containing copper, tin, indium and/or lead or their oxides, sulfides or phosphides.

10. A multi-layered plain slide bearing having a base layer, and having a slide layer carried by said base layer, said slide layer being constituted of a gaseous phase precipitant alloy, which substantially contains by weight from 20% to 70% of copper, at least 15% and at most 80% of lead and from 0% to 30% of tin, and which has a thickness of from 0.002 mm to 0.1 mm.

11. A multi-layered plain slide bearing as in claim 10, wherein the copper content of the alloy is substantially 50% by weight, the tin content of the alloy is substantially 10% by weight, with the balance of the alloy constituted of lead.

12. A multi-layered plain slide bearing as in claim 10, wherein the slide layer comprises basically an alloy having between 20% and 70% of copper by weight, and containing minute amounts of anitmony up to 1%.

13. A multi-layered plain slide bearing as in claim 10, wherein the slide layer comprises basically an alloy having between 20% and 70% of copper by weight, and containing minute amounts of indium.

14. A multi-layered plain slide bearing as in claim 10, wherein the slide layer comprises basically an alloy having between 20% and 70% of copper by weight, and containing minute amounts of cadmium.

15. A multi-layered plain slide bearing as in claim 10, wherein at least one intermediary metallic layer is provided between the said base layer and the said slide layer, the said slide layer being precipitated from a gaseous phase onto the uppermost one of the said intermediary layers.

16. A multi-layered plain slide bearing as in claim 10, and further including at least one intermediary metallic layer and a diffusion-prohibiting layer between the said base layer and the said slide layer, the said slide layer being precipitated from a gaseous phase onto the said diffusion-prohibiting layer which latter is interposed between the said intermediary layer and the said slide layer.

17. A multi-layered plain slide bearing as in claim 10, wherein the said slide layer is covered by a corrosion-protecting layer.

18. A multi-layered plain slide bearing as in claim 10, wherein the said slide layer is covered by a run-in layer, said run-in layer containing copper, tin, indium and/or lead or their oxides, sulfides, or phosphides.

* * * * *